United States Patent [19]

Takeshima et al.

[11] Patent Number: 5,633,094
[45] Date of Patent: May 27, 1997

[54] VALVE HAVING FACING LAYERS OF CO-FREE NI-BASE ALLOY

[75] Inventors: Kikuo Takeshima, Hitachi; Shin Kumagai, Ibaraki-ken; Masato Koshiishi, Takahagi; Yositeru Chiba, Hitachi, all of Japan

[73] Assignees: Hitachi, Ltd., Tokyo; Hitachi Kyowa Kogyo Co., Ltd., Ibaraki-ken, both of Japan

[21] Appl. No.: 548,758

[22] Filed: Oct. 26, 1995

[30] Foreign Application Priority Data

Oct. 28, 1994 [JP] Japan .................... 6-264839

[51] Int. Cl.⁶ .................... B32B 15/04; F16K 25/04
[52] U.S. Cl. .................... 428/679; 428/680; 251/368
[58] Field of Search .................... 428/679, 680, 428/686, 939; 251/368, 328, 327

[56] References Cited

U.S. PATENT DOCUMENTS

| | | | |
|---|---|---|---|
| 2,396,552 | 3/1946 | Cape | 251/368 |
| 2,458,502 | 1/1949 | Cape | 251/368 |
| 3,767,164 | 10/1973 | Robinson | 251/368 |
| 4,754,950 | 7/1988 | Tada et al. | 251/368 |
| 5,222,521 | 6/1993 | Kilhberg | 251/368 |

FOREIGN PATENT DOCUMENTS

| | | | |
|---|---|---|---|
| 55-72959 | 6/1980 | Japan | 251/368 |
| 58-187663 | 11/1983 | Japan | 251/368 |
| 62-1837 | 1/1987 | Japan . | |
| 62-130792 | 6/1987 | Japan . | |
| 4-276036 | 10/1992 | Japan | 251/368 |
| 2096279 | 10/1982 | United Kingdom | 251/368 |

OTHER PUBLICATIONS

Translation of Japanese Kokai Patent Application No. HEI 4[1992]–276038, Kikuo Takeshima et al., 18 pages of translation Oct. 1992.

Primary Examiner—John Zimmerman
Attorney, Agent, or Firm—Antonelli, Terry, Stout & Kraus, LLP

[57] ABSTRACT

Hard facing layers provided on engagement portions of a valve body and engagement portions of a valve box of a valve apparatus, consisting of cobalt-free Ni-base alloys. One of the Ni-base alloys for the hard facing layers comprises not more than 15% Fe and less than 2% W (tungsten), and the other comprises more than 15% Fe. More specifically, one of the cobalt-free Ni-base alloys essentially consists of, by weight, 15 to 20% Cr, 5 to 10% Si, 10 to 15% Fe, less than 2% W, and the balance of Ni and unavoidable impurities, and has a Vickers hardness (Hv) 510 to 630, and the other essentially consists of, by weight, 5 to 15% Cr, 5 to 10% Si, more than 15% and not more than 30% Fe, 1 to 4% W, and the balance of Ni and unavoidable impurities, and has a Vickers hardness (Hv) 400 to 470. The valve apparatus of the invention is suitably installed in a water pipe line which communicates with a nuclear reactor.

8 Claims, 3 Drawing Sheets

VALVE HAVING FACING LAYERS OF CO-FREE NI-BASE ALLOY

BACKGROUND OF THE INVENTION

The present invention relates to a valve apparatus comprising a valve body and a valve box which have engagement portions formed with hard facing layers of cobalt-free Ni-base alloys and, more particularly, to a valve apparatus including engagement portions which have an excellent wear resistance.

In a conventional valve apparatus, for example, as disclosed in JP-A-62-1837, a combination of a Cr—Ni—Fe-system iron alloy and a Cr—Nb—Mo—Ni-system Ni-base alloy has been employed for hard facing layers provided on engagement portions of a valve body and engagement portions of a valve box. Overlays of these alloys, which are formed by overlay welding, tend to crack.

When hard facing layers on engagement portions of a valve body and engagement portions of a valve box are both formed of an Ni-base alloy, as disclosed in JP-A-62-130792, the hard facing layers on the valve body and the valve box have the same hardness, and consequently, the sliding wear property is supposedly inferior.

In JP-A-3-36088, a combination of an Ni-base alloy containing not more than 10% Fe and an Ni-base alloy containing 15% Fe is suggested to use for hard facing layers of a valve body and a valve box in a valve apparatus for a light-water nuclear reactor. The Ni-base alloys are different in hardness with each other and thus improved in wear resistance and erosion resistance.

Generally, in a valve apparatus disposed in a water pipe line for a light-water nuclear reactor, engagement portions and guide portions of a valve body and a valve box of the valve apparatus are formed with hard facing layers of Co-base alloys by overlay welding so as to provide the engagement portions and the guide portions with wear resistance and erosion resistance. However, the engagement portions and the guide portions of the valve body and the valve box are in contact with high-temperature/high-pressure water of the light-water nuclear reactor, and therefore, Co in the hard facing layers of Co-base alloys is dissolved into reactor water. The dissolved Co enters into the reactor core along with the reactor water and becomes Co60, and then, Co60 circulates and adheres to pipes, turbines and other devices. This is thought to be one of the reasons why the amount of radiation exposure to operators who perform valve overhauls tends not to decrease when a periodic check-up of a light-water nuclear reactor plant is conducted.

In view of the above, there has been known an example in which Ni-base alloys without Co are used as materials for overlay welding to be formed on the surfaces of engagement portions of a valve apparatus. However, the known combination of Ni-base alloys for the engagement portions of the valve apparatus is regarded as inferior in the sliding property, i.e., scoring resistance. More specifically, sliding-contact portions of a valve apparatus not only require wear resistance but also need to endure repetition of slidings and a high contact pressure. During sliding operation of a valve body especially having a large diameter, engagement portions of the valve body tend to deform when a difference between pressures upstream and downstream of the valve body is large, and consequently, local contact pressures of the engagement portions are increased. Thus, the known combination of Ni-base alloys has a possibility of deterioration of the sliding property.

A material of hard facing layers on engagement portions of a valve body and engagement portions of a valve box in common use is stellite (a Co-base alloy) which has an excellent sliding property. Therefore, a novel material of hard facing layers on engagement portions of a valve body and engagement portions of a valve box is required to have a sliding property as excellent as that of stellite.

SUMMARY OF THE INVENTION

It is an object of the present invention to use, as materials of hard facing layers on engagement portions of a valve body and engagement portions of a valve box, alloys without Co (cobalt-free alloys) which have superior sliding properties and can endure a large number of repeating slidings and a high contact pressure.

Cobalt-free alloys for hard facing layers have been studied and developed so far in order to obtain wear resistance and erosion resistance which are as high as those of Co-base alloys. As cobalt-free alloys for hard facing layers, there has been known a combination of Ni-base alloys which are different in hardness with each other, as mentioned above, for improving the wear resistance (see JP-A-3-36088). In the invention, there is employed a combination of Ni-base alloys including larger amounts of Fe than the known combination of Ni-base alloys. Thus, the sliding property of a valve body to which a high contact pressure is applied can be improved.

According to a primary feature of the invention, hard facing layers provided on engagement portions of a valve body and engagement portions of a valve box of a valve apparatus consist of cobalt-free Ni-base alloys, one of the Ni-base alloys for the hard facing layers comprises not more than 15% Fe and less than 2% W (tungsten), and the other of the Ni-base alloys for the hard facing layers comprises more than 15% Fe. A suitable example of a combination of these Ni-base alloys for hard facing layers is an alloy essentially consisting of, by weight, 15 to 20% Cr, 5 to 10% Si, 10 to 15% Fe, less than 2% W, and the balance of Ni and unavoidable impurities, and having a Vickers hardness (Hv) is a range from 510 to 630, and an alloy essentially consisting of, by weight, 5 to 15% Cr, 5 to 10% Si, more than 15% and not more than 30% Fe, 1 to 4% W, and the balance of Ni and unavoidable impurities, and having a Vickers hardness (Hv) is a range from 400 to 470.

When ceramics coatings are formed on the surfaces of the valve body and the valve box where they are in sliding-contact with each other, including the valve body engagement portions and the valve box engagement portions, wear resistance of the valve apparatus can be effectively improved.

The valve apparatus comprising the valve body and the valve box according to the invention is suitably disposed in a water pipe line which communicates with a nuclear reactor, and can solve the problem of the conventional technology that Co in hard facing layers on valve body engagement portions and valve box engagement portions is dissolved into water of the nuclear reactor. In consequence, the amount of radiation exposure of operators who conduct valve overhauls can be reduced.

DETAILED DESCRIPTION OF THE INVENTION

Figure 1:
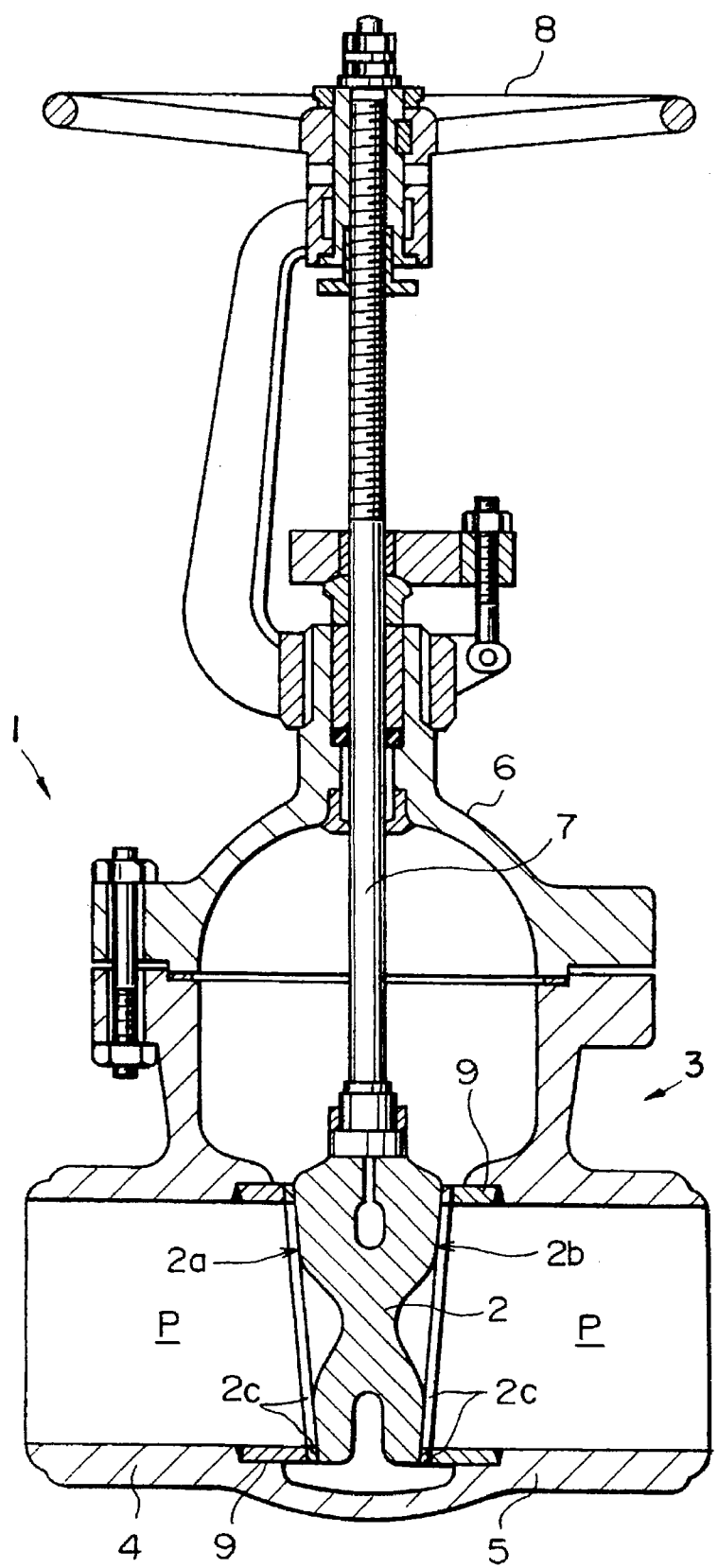
FIG. 1 shows a valve apparatus including engagement portions of a valve body and engagement portions of a valve box according to the present invention.

A cobalt-free Ni-base alloy employed in the present invention is a Cr—Si—Fe-system alloy, and has an alloy structure in which hard phases are supported by the matrix. By this structure, an excellent sliding property, i.e., a high scoring resistance, can be obtained. The primary feature of the invention is to use a particular combination of materials of hard facing layers. One of the materials of hard facing layers in this combination contains more than 15% Fe so that the matrix which supports hard phases can be strengthened (toughness can be improved), thereby improving the sliding property. Further, the other of the materials of hard facing layers contains not more than 15% Fe and less than 2% tungsten in order to have a hardness (Hv 510 to 630) higher than that of the mating material (hardness: Hv 400 to 470). Due to the hardness difference between the two materials of hard facing layers, wear resistance of the materials of hard facing layers can be improved.

The alloy preferably contains a larger amount of Cr to maintain the corrosion resistance. However, excessive addition of Cr produces ferrite. Therefore, the allowable maximum amount of Cr is 20%. By controlling the Cr amount in the Ni-base alloys of the invention, the two materials of hard facing layers can have a hardness difference. Preferably, the Cr amount in one of the materials of hard facing layers is 5 to 15%, and the Cr amount in the other material is 10 to 20%.

There is a high possibility that a Ni-base alloy of the invention may contain boron (B) as an impurity element. If the amount of boron exceeds a certain value, weldability of the alloy material is deteriorated. This problem can be overcome by adding Si to the Ni-base alloy. From the foregoing point of view, according to the invention, one of the Ni-base alloys for hard facing layers contains not more than 1% (preferably, about 0.5%) boron and 5 to 10% Si, and the other of the Ni-base alloys for hard facing layers contains not more than 1% (preferably, about 1%) boron and 5 to 10% Si. With such amounts of boron and Si, heat treatment after welding can be easily carried out.

Fe and tungsten (W) are necessary for maintaining hardness of the alloy. However, as the Fe amount is increased, the alloy becomes relatively soft. Considering the fact, according to the invention, one of the Ni-base alloys for hard facing layers includes 10 to 15% Fe and less than 2% tungsten, and the other of the Ni-base alloys for hard facing layers includes more than 15% and not more than 30% Fe. When the alloy includes more than 15% and not more than 30% Fe, it becomes softer than the conventional Ni-base alloy (one of the materials for hard facing layers) (Fe: 2.5% at the maximum). Therefore, the upper limit of hardness of the invention Ni-base alloy containing more than 15% and not more than 30% Fe is set at Hv 470, and the lower limit of hardness of the same is set at the same value as the hardness of a Co-base alloy having an excellent sliding property (Hv 400). That is to say, hardness of the material for hard facing layers which includes more than 15% and not more than 30% Fe is within a range of Hv 400 to Hv 470. The upper limit of hardness is Hv 470 because a value lower than the hardness Hv 490 of one of the alloy materials suggested in JP-A-3-36088 is selected. The material for hard facing layers which includes 10 to 15% Fe becomes softer than the conventional Ni-base alloy (the other of the materials for hard facing layers) (Fe: 5.0% at the maximum). Consequently, the upper limit of hardness of the invention Ni-base alloy including 10 to 15% Fe is set at Hv 630, and the lower limit of hardness of the same is set at Hv 510 which is not less than Hv 40 different from the upper limit of hardness of the mating material. The upper limit of hardness is Hv 630 because a value lower than the hardness Hv 640 of the other of the alloy materials suggested in JP-A-3-36088 is selected. Thus, hardness of the material for hard facing layers which includes 10 to 15% Fe is within a range of Hv 510 to Hv 630. The reason for the abovementioned hardness difference of not less than Hv 40 is that the inventors of the present invention have confirmed that a combination of sliding materials of Ni-base alloys which have a small hardness difference does not exhibit a favorable sliding property.

In the valve apparatus of the invention, hard facing layers are provided on valve body engagement portions and valve box engagement portions by overlay welding or powder spraying. Wear resistance of the hard facing layers can be further improved by coating the hard facing layers with ceramics. Ceramics coating is effected by the plasma arc process. In the plasma arc process, metal is evaporated and ionized by arc plasma in a vacuum chamber, and a great energy is applied to the evaporated metal due to the function of electric field so that the evaporated metal is deposited on a substrate, thereby forming a ceramics film. Such a ceramics film has an excellent sliding property.

FIG. 1 shows a slide valve apparatus 1 including valve body engagement portions and valve box engagement portions on which hard facing layers according to the invention are provided. The valve apparatus 1 comprises a valve body 2 made of cast steel and a valve box 3 made of cast steel. Main components of the valve box 3 are a valve box body including a pair of pipe connectors 4, 5 which are connected to a water pipe line so as to define one part of the water passage, and a bonnet 6 which covers an opened upper portion of the valve box body. The valve body 2 is moved vertically through a valve spindle 7 by handling an operation wheel 8, thereby opening and closing the passage p in the two pipe connectors 4, 5. The valve body 2 has two side surfaces 2a, 2b which are substantially circular and face the passage p. Annular hard facing layers 2c, 2c made of a cobalt-free Ni-base alloy are provided on circumferential portions of the circular side surfaces 2a, 2b, i.e., valve body engagement portions. A pair of hard facing layers 9, 9 made of a cobalt-free Ni-base alloy, which are annular engagement portions, are provided on the pipe connectors 4, 5 of the valve box 3 by welding. The hard facing layers 2c, 2c on the valve body engagement portions are in sliding contact with end surfaces of the engagement portions 9, 9.

TABLE 1

| | Chemical Composition of Ni-Base Alloy | | | | | | | | Hardness | |
|---|---|---|---|---|---|---|---|---|---|---|
| | Cr | B | Si | C | Fe | W | Sn | Co | Ni | (Hv) |
| Specimen 1 | 3.5 | 0.45 | 5.35 | 1 | 17.5 | 1.8 | — | — | Bal. | 430 | Invention Material |
| Specimen 2 | 10.8 | 0.9 | 7.3 | 0.3 | 14.8 | 1.2 | 0.7 | — | Bal. | 590 | Invention Material |
| Conventional Specimen 3 (JP-A-3-36088) | 10 | 0.5 | 5.5 | 1 | 2.5 | 2 | — | — | Bal. | 490 | |
| Conventional Specimen 4 (JP-A-3-36088) | 17.5 | 0.9 | 6.8 | 0.3 | 5 | 1.2 | 0.7 | — | Bal. | 640 | |
| Comparative Specimen 5 | 15 | 0.6 | 5 | 0.3 | 5 | 2 | — | — | Bal. | 480 | |
| Comparative Specimen 6 | 3.4 | — | 5.4 | 1.0 | 17 | 2 | — | — | Bal. | 500 | |
| Comparative Specimen 7 | 28 | — | 1.2 | 1.0 | 3.0 | 4.0 | — | Bal. | — | 400 | Co-Base |

*Note: Hardnesses of the materials were measured as welded by overlay-welding.

In Table 1, specimens No. 1 to 6 are alloy powders which were manufactured by the atomizing method after fusing in a high-frequency vacuum fusing furnace.

Particle sizes of the powders used in the tests were +70 (passed through a 70-mesh screen) to +210 (passed through a 210-mesh screen).

By use of the powders, two overlays were welded on plate materials of JIS S25C by the plasma powder overlay welding process, from which wear test pieces were obtained.

Wear tests were performed at a room temperature or in 300° C. saturated steam under the following conditions: The contact pressure was 2.5, 5.0, 7.5, 10, and 20 kg/mm$^2$; the wear sliding velocity was 300 mm/min; and the number of slidings was 100. Rough states of the sliding surfaces after the tests were inspected by measuring the surface roughness.

Figure 2:
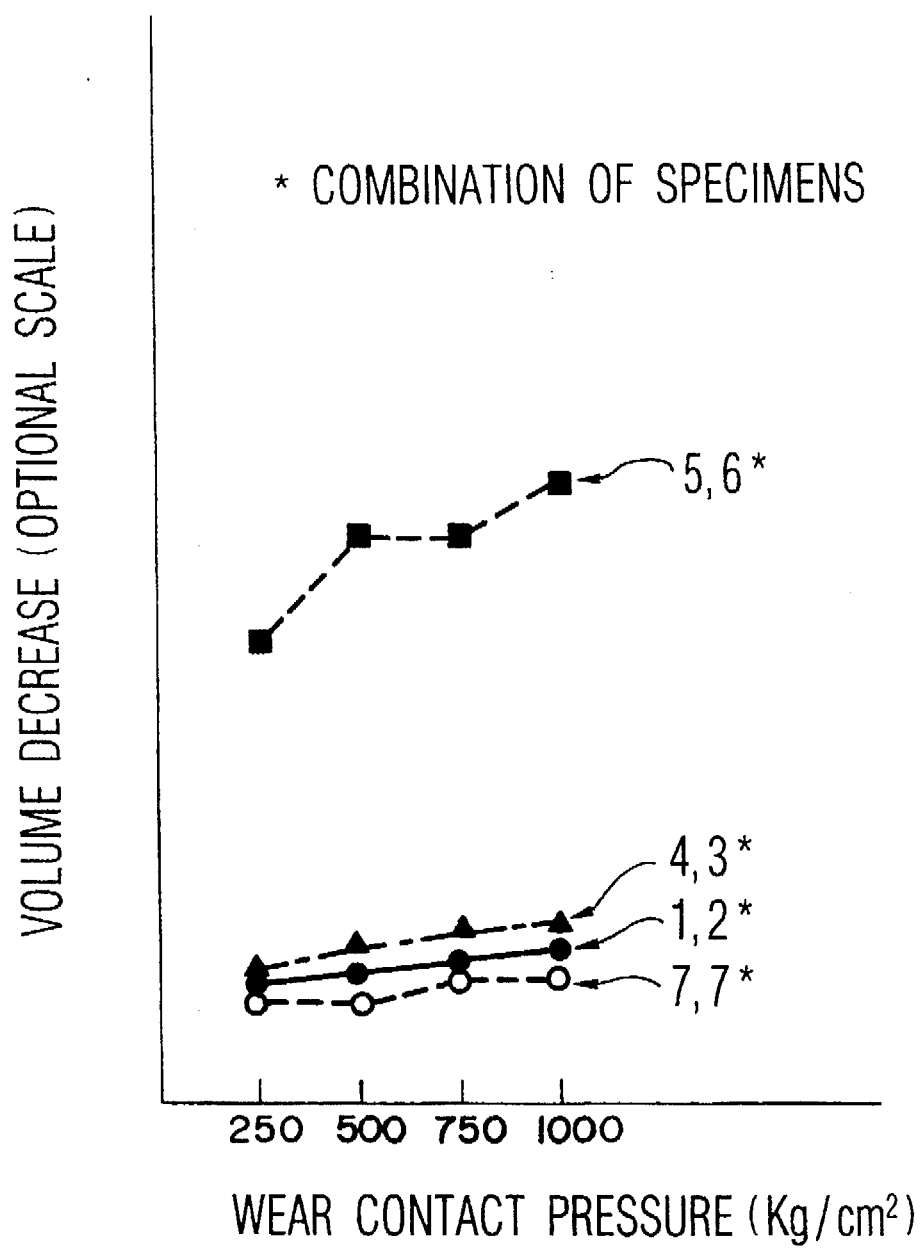
FIG. 2 is a graph illustrating results of wear tests which were performed with various materials of hard facing layers to be formed on valve body engagement portions and valve box engagement portions, showing the relationship between volume decreases of the materials of hard facing layers and wear contact pressures.
Figure 3A:
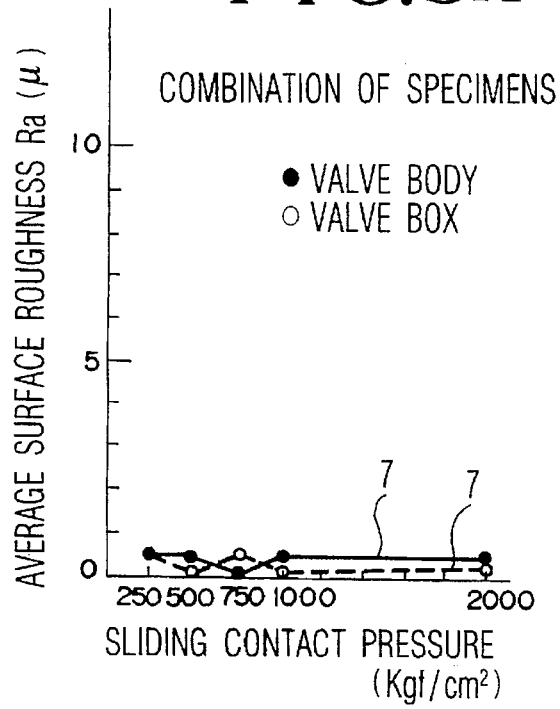
FIGS. 3A–3D are graphs illustrating results of wear tests, respectively, which were performed with various materials of hard facing layers to be formed on valve body engagement portions and valve box engagement portions, showing the relationship between surface roughnesses of the materials of hard facing layers and wear contact pressures.
Figure 3B:
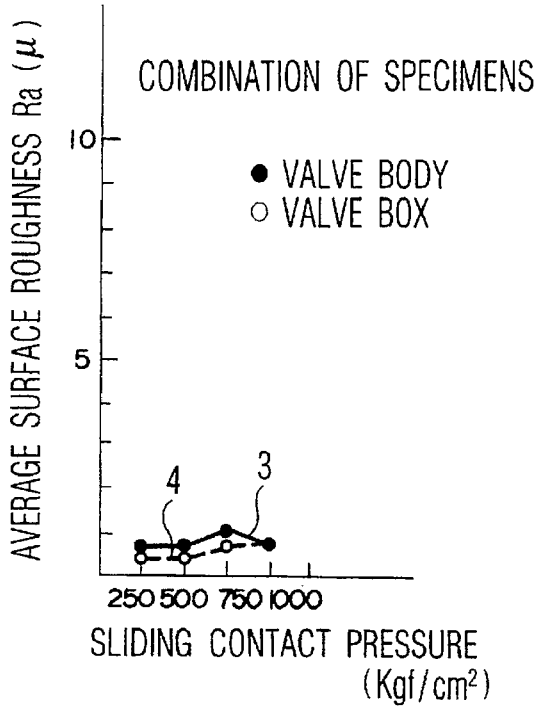
Figure 3C:
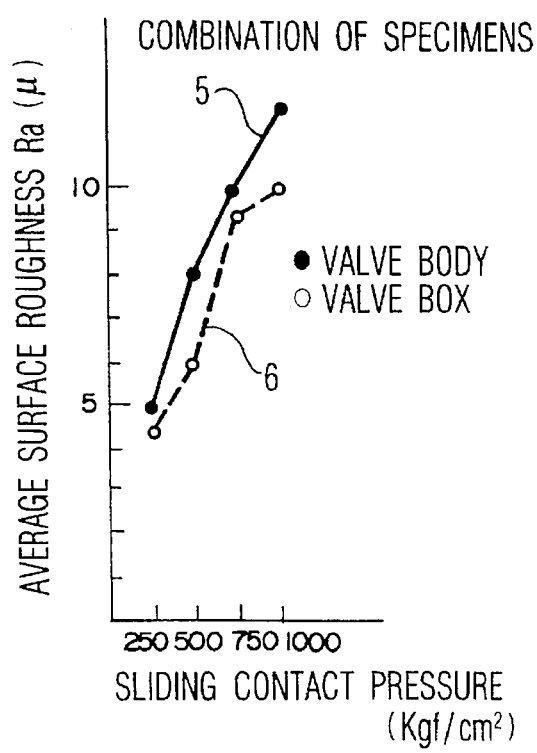
Figure 3D:
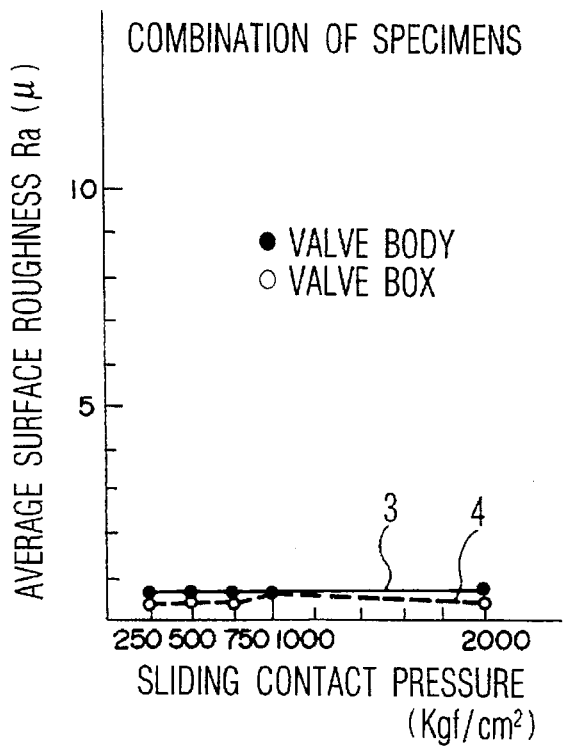

Table 2 shows kinds of combinations of the materials, FIG. 1 shows volume decreases due to wear, and FIG. 2 shows average surface roughnesses Ra (μ) at the time of wear.

TABLE 2

(Contact pressure: 100 kg/cm$^2$)

| Combination of Materials of Engagement Portions | | Number of Slidings of |
|---|---|---|
| Material of Engagement Portions of Valve Box | Material of Engagement Portions of Valve Body | Valve (Upon Break in Hermetic Tightness) |
| Embodiment | | |
| 1 | 2 | 1 | 100 or more |
| 2 | 4 | 3 | 100 |
| 3 | 5 | 6 | 65 |
| Comparative Example 1 | 7 | 7 | 100 or more |

It was confirmed that, from combinations of the specimens 1 to 4, surface roughness of not more than 1.0 μRa is obtained in room-temperature water and in 300° C. saturated steam.

Also, it was confirmed that, from combinations of the specimens 1 and 2, surface roughness of not more than 1.0 μRa is obtained at a high contact pressure.

A material having a surface roughness of μRa can be employed for valve engagement portions by substantially the same maintenance as the conventional cobalt-base alloy for valve engagement portions.

Sliding tests were conducted, simulating actual valve contact pressures of the above-mentioned specimens and 1 and 2, and it was found that the sliding property is excellent.

As obviously understood from Table 2, a combination of the specimens Nos. 1 and 2 of Table 1 can endure 100 or more slidings of the valve and can maintain hermetic tightness at a contact pressure as high as 2000 kg/cm$^2$ in substantially the same manner as a combination of the specimens No. 7.

Thus, as materials without Co, the combination of the specimens 1 and 2 in Table 1 can suitably produce a performance as a valve which is not inferior to that of the conventional example of materials with Co.

As will be apparent from the above, according to the present invention, even if a valve is installed in a water pipe line of a nuclear reactor, amounts of radiation exposures by radioactive rays from the neighboring equipment are not increased, and also, wear resistance and hermetic tightness of a valve seat and a valve body of the valve can be sufficiently obtained.

What is claimed is:

1. A valve apparatus comprising a valve body and a valve box which have hard facing layers provided on engagement portions thereof, wherein said hard facing layers on the engagement portions of the valve body and the engagement portions of the valve box consist of cobalt-free Ni-base alloys, one of said Ni-base alloys for the hard facing layers comprises not more than 15% Fe and less than 2% W (tungsten), and the other of said Ni-base alloys for the hard facing layers comprises more than 15% Fe.

2. A valve apparatus according to claim 1, wherein said one of said Ni-base alloys has a Vickers hardness (Hv) in a range from 510 to 630, and said other of the Ni-base alloys has a Vickers hardness (Hv) in a range from 400 to 470.

3. A valve apparatus according to claim 2, wherein said one of the Ni-base alloys for the hard facing layers essentially consists of, by weight, 15 to 20% Cr, 5 to 10% Si, 10 to 15% Fe, less than 2% W, and the balance of Ni unavoidable impurities, and and said other of the Ni-base alloys for the hard facing layers essentially consists of, by weight, 5 to 15% Cr, 5 to 10% Si, more than 15% and not more than 30% Fe, 1 to 4% W, and the balance of Ni and unavoidable impurities.

4. A valve apparatus according to claim 2, wherein ceramics coatings are formed on the surfaces of the valve body and the valve box where they are in sliding contact with each other.

5. A valve apparatus comprising the valve body and the valve box according to claim 2, which is disposed in a water pipe line communicating with a nuclear reactor.

6. A combination of materials which form hard facing layers provided on engagement portions of a valve body and engagement portions of a valve box, wherein said hard facing layers on the engagement portions of the valve body and the engagement portions of the valve box consist of cobalt-free Ni-base alloys, one of said Ni-base alloys for the hard facing layers comprises not more than 15% Fe and less than 2% W (tungsten), and the other of said Ni-base alloys for the hard facing layers comprises more than 15% Fe.

7. A valve apparatus according to claim 6, wherein said one of said Ni-base alloys has a Vickers hardness (Hv) in a range from 510 to 630, and said other of the Ni-base alloys has a Vickers hardness (Hv) in a range from 400 to 470.

8. A combination of materials which form hard facing layers provided on engagement portions of a valve body and engagement portions of a valve box, wherein said hard facing layers on the engagement portions of the valve body and the engagement portions of the valve box consist of cobalt-free Ni-base alloys, one of said Ni-base alloys for the hard facing layers essentially consists of, by weight, 15 to 20% Cr, 5 to 10% Si, 10 to 15% Fe, less than 2% W, and the balance of Ni and unavoidable impurities, and has a Vickers hardness (Hv) in a range from 510 to 630, and the other of said Ni-base alloys for the hard facing layers essentially consists of, by weight, 5 to 15% Cr, 5 to 10% Si, more than 15% and not more than 30% Fe, 1 to 4% W, and the balance of Ni and unavoidable impurities, and has a Vickers hardness (Hv) in a range from 400 to 470.

* * * * *